(12) United States Patent
Zumstrull

(10) Patent No.: US 9,709,186 B2
(45) Date of Patent: Jul. 18, 2017

(54) MODULAR ACTUATOR UNIT FOR A FUEL INJECTION VALVE

(71) Applicant: Continental Automotive GmbH, Hannover (DE)

(72) Inventor: Claus Zumstrull, Regenstauf (DE)

(73) Assignee: Continental Automotive GmbH (DE)

( * ) Notice: Subject to any disclaimer, the term of this patent is extended or adjusted under 35 U.S.C. 154(b) by 0 days.

(21) Appl. No.: 14/781,443

(22) PCT Filed: Apr. 16, 2014

(86) PCT No.: PCT/EP2014/057802
§ 371 (c)(1),
(2) Date: Sep. 30, 2015

(87) PCT Pub. No.: WO2014/170399
PCT Pub. Date: Oct. 23, 2014

(65) Prior Publication Data
US 2016/0053910 A1 Feb. 25, 2016

(30) Foreign Application Priority Data
Apr. 17, 2013 (DE) .................... 10 2013 206 933

(51) Int. Cl.
*F16K 31/00* (2006.01)
*F02M 57/00* (2006.01)
*F16K 7/12* (2006.01)

(52) U.S. Cl.
CPC ......... *F16K 31/007* (2013.01); *F02M 57/005* (2013.01); *F16K 7/12* (2013.01); *F16K 31/008* (2013.01); *F02M 2200/244* (2013.01)

(58) Field of Classification Search
CPC ........ F16K 31/007; F16K 31/008; F16K 7/12; F02M 57/005; F02M 2200/244
(Continued)

(56) References Cited

U.S. PATENT DOCUMENTS 3,489,931 A * 1/1970 Teaford ................. H01L 41/107
310/328
5,281,888 A 1/1994 Takeuchi
(Continued)

FOREIGN PATENT DOCUMENTS

DE 19960971 3/2001
DE 10127932 12/2002
(Continued)

OTHER PUBLICATIONS

German Examination Report for German Application No. 10 2013 206 933.2 mailed Oct. 21, 2013.
(Continued)

*Primary Examiner* — John K Fristoe, Jr.
*Assistant Examiner* — Ian Paquette
(74) *Attorney, Agent, or Firm* — RatnerPrestia

(57) ABSTRACT

An actuator unit for a fuel injection valve of a vehicle internal combustion engine. The actuator unit includes an electronic component formed as a stack. The component includes a plurality of electrode layers and a plurality of material layers which are arranged alternately and react to the application of an electric field. The component also has two outer electrodes electrically connected to respective electrode layers on at least one circumferential side of the component. Additionally, the actuator unit has a piezoelectric sensor coupled to the component in a force-fitting manner, in the stroke direction of the component. When the component is in operation, the sensor detects a force generated by the component, as a voltage or charge between two electrodes arranged on opposing end faces, of a sensor element. The electrodes are deposited from an electrically conductive material directly onto at least the end faces of the sensor element.

11 Claims, 3 Drawing Sheets

(58) Field of Classification Search
USPC .................................................. 251/129.06
See application file for complete search history.

(56) References Cited

U.S. PATENT DOCUMENTS

| | | | | |
|---|---|---|---|---|
| 5,325,012 | A * | 6/1994 | Sato | ...................... H01L 41/313 |
| | | | | 228/121 |
| 6,608,427 | B2 * | 8/2003 | Akiyama | ............ H01L 41/1132 |
| | | | | 310/321 |
| 6,929,192 | B2 | 8/2005 | Schmauser | |
| 8,421,310 | B2 * | 4/2013 | Setoguchi | ............. F16K 31/007 |
| | | | | 310/328 |
| 9,016,127 | B2 * | 4/2015 | Saito | ...................... G01P 15/09 |
| | | | | 73/493 |
| 2006/0255695 | A1 | 11/2006 | Endriss | |
| 2012/0325935 | A1 | 12/2012 | Wuerfel | |
| 2015/0128910 | A1 | 5/2015 | Zhang | |

FOREIGN PATENT DOCUMENTS

| | | |
|---|---|---|
| DE | 10345730 | 4/2005 |
| DE | 102008007205 | 8/2009 |
| DE | 102009044295 | 9/2010 |
| DE | 102009002311 | 10/2010 |
| FR | 2907544 | 4/2008 |
| WO | 2011069717 | 6/2011 |
| WO | 2013139671 | 9/2013 |

OTHER PUBLICATIONS

International Search Report for International Application No. PCT/EP2014/057802 mailed Jul. 7, 2014.

* cited by examiner

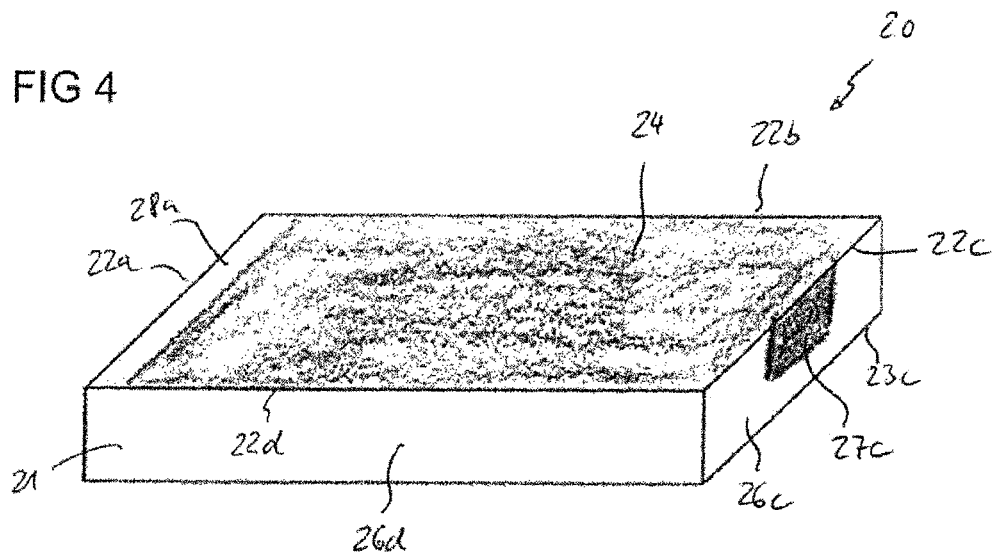
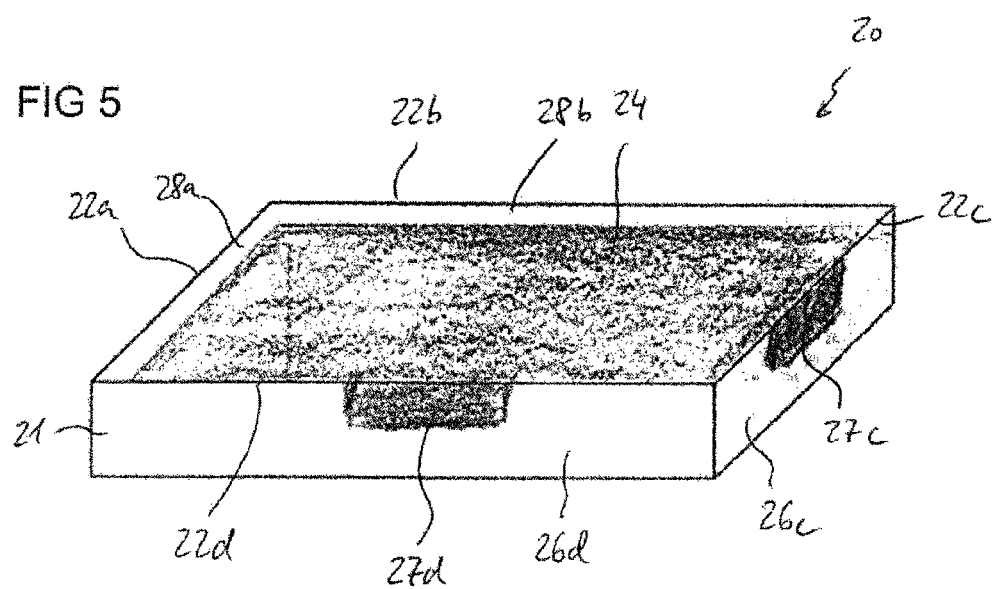

MODULAR ACTUATOR UNIT FOR A FUEL INJECTION VALVE

CROSS REFERENCE TO RELATED APPLICATIONS

This application is the U.S. National Phase Application of PCT International Application No. PCT/EP2014/057802, filed Apr. 16, 2014, which claims priority to German Patent Application No. 10 2013 206 933.2, filed Apr. 17, 2013, the contents of such application being incorporated by reference herein.

FIELD OF THE INVENTION

The invention concerns a modular actuator unit for an injection valve of an internal combustion engine of a vehicle. Such an actuator unit is used for the injection of fuel into a combustion chamber of a cylinder of the internal combustion engine.

BACKGROUND OF THE INVENTION

An actuator unit for an injection valve of an internal combustion engine of a vehicle typically comprises a component in the form of a stack that comprises a plurality of electrode layers as well as a plurality of layers of material that react to the application of an electric field, wherein each layer of material is disposed between two of the electrode layers. Such a component of layers stacked one above the other and comprising alternating layers of material and electrode layers is generally referred to as a stack. The currently best known electronic component of this type is generally a stack referred to as a piezoelectric actuator, which is used as an actuating element in injection valves of diverse engine types for motor vehicles. The layers of material are ceramic layers in said piezoelectric actuator.

Such a stack usually comprises a rectangular or square cross-section when observed in plan view. The stack is typically electrically contacted on two mutually opposing peripheral sides. In order to be able to perform this carefully in a technological sense, the electrode layers are configured geometrically for example such that only every second electrode layer extends laterally to one of the two peripheral sides, whereas the respective other electrode layers do not extend to said peripheral side. The same applies to the other peripheral side of the stack.

The electrical contacting of the electrode layers is performed by means of two outer electrodes, which are generally electrically connected to respective electrode layers on at least one peripheral side of the component and typically on two mutually opposing peripheral sides.

The finished component is enclosed by a tubular spring, which typically consists of a metal. The tubular spring is used to pretension the component stack during operation of the actuator unit and thereby to prevent damage to the ceramic. The tubular spring is also used to provide a restoring force for the deflected component stack. A layer, for example of silicon, which covers at least the outer electrodes, is provided on the component stack on the outer peripheral side as insulation material between the tubular spring and the outer electrodes of the component stack.

With increasing requirements on emissions and consumption, the requirements on the injection of the fuel into the combustion chamber are increasing. Higher pressures, temperatures as well as multiple injections consequently require higher accuracy in the metering of the injected fuel. In order to achieve the required accuracies, it is therefore not sufficient to operate the actuator in an actuating mode. Rather, regulation is required. For regulation, defined measurement variables are required, which are determined on or in the actuator unit, in order to calculate therefrom the corresponding regulation variables.

For example, sensors can be used for this that directly detect the opening and closing time point of a needle of the injection valve actuated by the actuator. Such a sensor can for example be a piezoelectric force sensor that is coupled to the piezoelectric actuator in a force-fit manner. The measurement accuracy that can be achieved here is, however, not high enough for precise regulation.

SUMMARY OF THE INVENTION

An aspect of the present invention is an actuator unit for an injection valve of an internal combustion engine of a vehicle that is structurally and/or functionally improved, so that higher measurement accuracy of the force profile of the piezoelectric actuator is achieved.

An aspect of the invention provides an actuator unit for an injection valve of an internal combustion engine of a vehicle. The actuator unit comprises an electronic component in the form of a stack. The component comprises a plurality of electrode layers and a plurality of layers of material that react to the application of an electric field, wherein the layers of material and t h e electrode layers are stacked alternately. The component also comprises two outer electrodes, to which the electrode layers are alternately electrically connected on at least one peripheral side of the component. The actuator unit also comprises a piezoelectric sensor, which is coupled in a force-fit manner to the component in the stroke direction of the component. During operation of the component, the sensor detects a force generated by the component, which can be detected as a voltage or charge between two electrodes disposed on opposite end faces of a sensor body. The electrodes are applied from an electrically conductive material directly to at least the end faces of the sensor body.

An aspect of the invention is based on the fact that for high measurement accuracy the coupling point between the component (piezoelectric actuator) and the sensor is of great significance in relation to its stiffness and force transfer. With conventional piezoelectric sensors the electrodes are formed by metal films applied to the side and end faces, which are joined by means of an adhesive to the side and end faces of the sensor body.

Because the metal films cannot be applied in a fully planar manner to the sensor body and the adhesive also has elastic properties after setting, an overall elastic coupling region results, which causes errors in the measurement of the force produced by the component or does not correctly reproduce the time profile.

By the direct application according to an aspect of the invention of the electrodes to the sensor body, for example by plasma deposition or vapor deposition or sputtering, the elasticity of the coupling region can be reduced or even almost completely eliminated. In particular, there is no loss of stiffness as a result of the conventionally used adhesive. The omission of adhesive has the further advantage that no contamination by solvents-adhesives can occur.

The end faces constitute mutually opposite primary sides of the sensor body that are disposed parallel to each other. The primary sides of the sensor body are disposed in the actuator unit preferably parallel to the layers of material or the electrode layers of the component (piezoelectric actuator).

The electrodes applied directly to the sensor body can have a different thickness. They can also have the same thickness.

The geometry of the two electrodes is freely selectable. The geometry can for example be determined by masking or similar.

The proposed embodiment enables the separate manufacture of the sensor and the piezoelectric actuator, which can be joined together at a later point in time.

As material for the electrodes, metals such as for example silver, copper, gold, palladium or alloys thereof can be used. Also other conductive materials are possible.

The higher stiffness of the coupling region is also promoted in that the direct application of the electrodes enables a smaller electrode thickness. Whereas with a conventional actuator unit the thickness of the metal film is between 50 µm and 80 µm, the thickness of the electrodes according to one embodiment can be reduced to less than 20 µm, in particular to less than 10 µm.

According to a further embodiment, a respective end face is bounded by side edges, wherein the electrode disposed on the respective end face is spaced apart from at least one of the associated side edges. This enables an unwanted electrical connection to the outer electrodes of the piezoelectric actuator or other conductive components to be easily prevented.

According to another advantageous embodiment, at least one contacting segment of a respective electrode is disposed on at least one lateral surface of the sensor body, wherein the at least one contacting segment and the associated electrode are produced across a side edge in one step. The contacting segments on the lateral surface are used for the electrical contacting of the electrodes. Because these—in contrast to conventional actuator units—are now disposed on the lateral surfaces, the overall structure of the actuator unit is simplified.

With conventional sensor units, in which the electrodes are formed by metal films, because of the small thickness of the sensor body (generally less than 0.5 mm) said electrodes cannot be bent around the lateral surface. Instead of this the contacting segment of the electrode facing the stack (so-called inner electrode) must be bent towards the piezoelectric actuator and the electrode facing away from the stack (so-called outer electrode) must be bent towards an insulator. In particular, suitable insulation measures must be provided for the inner electrode for this, which is not necessary with the approach according to the invention.

According to another advantageous embodiment, at least on a side edge opposite the contacting segment the spacing is provided between the electrode and said side edge. This prevents insulation problems in relation to the outer electrodes of the piezo actuator without special further measures.

According to another advantageous embodiment, the sensor body is a monolithic plate made of a piezo ceramic. In particular, the piezo ceramic of the sensor can be made of a different material from the layers of material of the component.

According to another advantageous embodiment, the sensor is connected to the component by means of an insulation layer in a force-fit manner. The sensor can also be supported by an insulation layer on a housing of the actuator unit on the side facing away from the piezoelectric actuator.

BRIEF DESCRIPTION OF THE DRAWINGS

Aspects of the invention are explained in detail below using exemplary embodiments in the figures. In the figures:

FIG. 4 shows a third exemplary embodiment of a sensor configured according to the invention for the actuator unit according to FIG. 1, and FIG. 5 shows a fourth exemplary embodiment of a sensor configured according to the invention for the actuator unit according to FIG. 1.

DETAILED DESCRIPTION OF THE PREFERRED EMBODIMENTS

Figure 1:
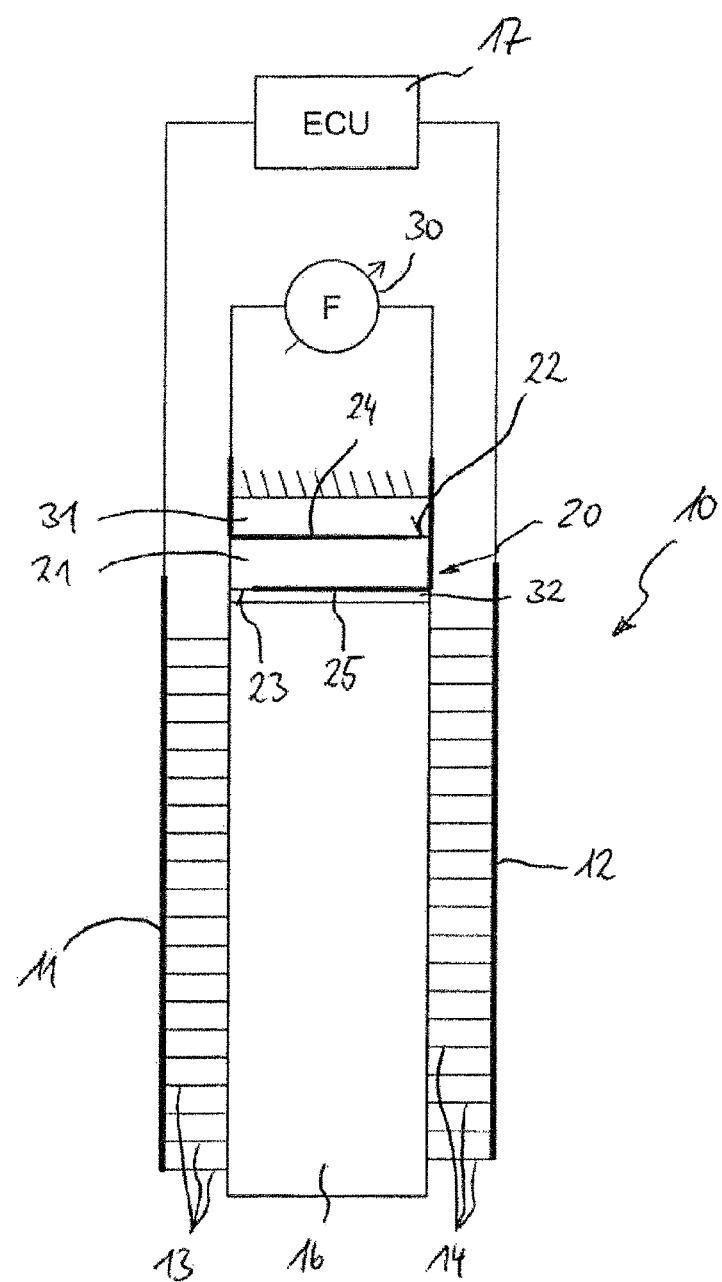
FIG. 1 shows a schematic representation of an actuator unit according to the invention.

FIG. 1 shows in a schematic representation an actuator unit according to an aspect of the invention for an injection valve of an internal combustion engine of a vehicle. The same comprises an electronic component 10 in the form of a stack. Such a stack 16 usually has a rectangular or square cross-section when seen in plan view. The component stack 16 comprises (not visible in FIG. 1) a plurality of electrode layers or a plurality of layers of material that react to the application of an electric field, wherein each of the layers of material is disposed between two of the electrode layers. The electrical contacting takes place via two outer electrodes 11, 12, which are electrically connected to respective electrode layers by means of schematically represented conductors 13, 14. The outer electrodes 11, 12 are connected to a control unit 17 (ECU-Electronic Control Unit) for activating the component stack 16. The outer electrodes 11, 12 are disposed on at least one peripheral side, but preferably on two different peripheral sides of the stack, which are in particular preferably opposite each other.

By applying an electric field to the two outer electrodes 11, 12 by means of a control signal of the control unit 17, a deflection of the component stack 16 (so-called piezoelectric actuator) can be achieved.

In order to be able to mechanically protect the component stack provided with the two outer electrodes, an insulation layer, for example of silicon (not shown), is usually applied to the peripheral sides of the component stack. In order to be able to prevent damage to the component stack during its actuation by an actuator and otherwise to be able to exert a restoring force on the component stack if activation by means of the two outer electrodes 11, 12 is no longer occurring, a tubular spring enclosing the component 10 (not shown) is provided. The tubular spring is typically made of a metal. Whereas the lower end of the component stack 16 in the plate direction is brought into engagement with a needle (also not shown) of an injection valve or a different component of a hydraulic system of the injection valve, in order to inject fuel into a combustion chamber in the event of deflection of the component stack 16, a sensor 20 is connected to the component stack 16 on the upper end in the plate direction in a force-fit manner in the stroke direction of the component stack 16. The sensor 20 can for example be supported on a housing component (not shown) of the injection valve for this purpose.

The sensor 20 comprises a sensor body 21, which is formed by a monolithic plate of a piezo ceramic. During operation of the component 10 the sensor 20 detects a force F produced by the component stack 16, which can be detected as a voltage between two electrodes 24, 25 disposed on opposite lateral surfaces 22, 23 of the sensor body 21. The electrodes 24, 25 are connected to a voltage measurement device 30 for this purpose, which detects the voltage produced by the piezo ceramic and converts the same into the force correlated therewith.

An insulation layer 31, 32 is applied to each of the electrodes 24, 25 in order to prevent an electrical short circuit of the so-called outer electrode 24 to the housing of the injection valve or of the so-called inner electrode 25 to the component stack 16 or its outer electrodes 11, 12. For this reason the contacting of the electrodes 24, 25 does not take place in the region of the end faces 22, 23, but in the region of a lateral surface 26a, 26b, 26c, 26d of the sensor body by means of contacting segments 27a, 27b, 27c, 27d of the electrodes 24, 25.

The thickness of the sensor body 21 is approximately 0.5 mm. The lengths of the side edges are for example between 2 and 3 mm, wherein other dimensions are also possible. Typically, the side lengths of the sensor body are chosen to equal the side lengths of the actuator. The sensor body 21 can optionally have a square, a rectangular or a different cross-section in plan view. The electrodes 24, 25 are applied from an electrically conductive material directly on at least the end faces of the sensor body. Directly means that the electrode material is applied directly onto the sensor body by the manner of the generation of the contact without an adhesive or other adhesive material. For example silver, gold or copper, palladium or alloys thereof can be used as electrically conductive material. Said materials can be applied directly onto the sensor body 21 by plasma deposition, vapor deposition or sputtering. Together with the electrodes 24, 25 applied to a respective end face 22, 23, one or a plurality of contacting segments 27a, 27b, 27c, 27d can also be applied to one or a plurality of lateral surfaces 26a, 26b, 26c, 26d of the sensor body 21, for example by turning of the sensor body 21 during manufacture. By using masking during the manufacturing process, any contours of the electrodes 24, 25 and/or of the contacting segments 27a, 27b, 27c, 27d can be produced during this.

Said methods for the direct application of the material of the electrodes 24, 25 enable, in comparison with metal films, very thin electrodes of about 10 to 20 μm thickness. At the same time, a very flat surface can be achieved, so that a stiff connection to the component stack is possible.

FIGS. 2 to 5 each show in a perspective representation different exemplary embodiments of a sensor 20 that is used in an actuator unit according to FIG. 1. The exemplary embodiments differ in the shape of the electrodes and the arrangement or number of the contacting segments. Because of the perspective representation, in each case only the outer electrode 24 on the end face 22 and the side edges 26c and 26d of the sensor body with the contacting segment(s) 27c, 27d can be seen.

Figure 2:
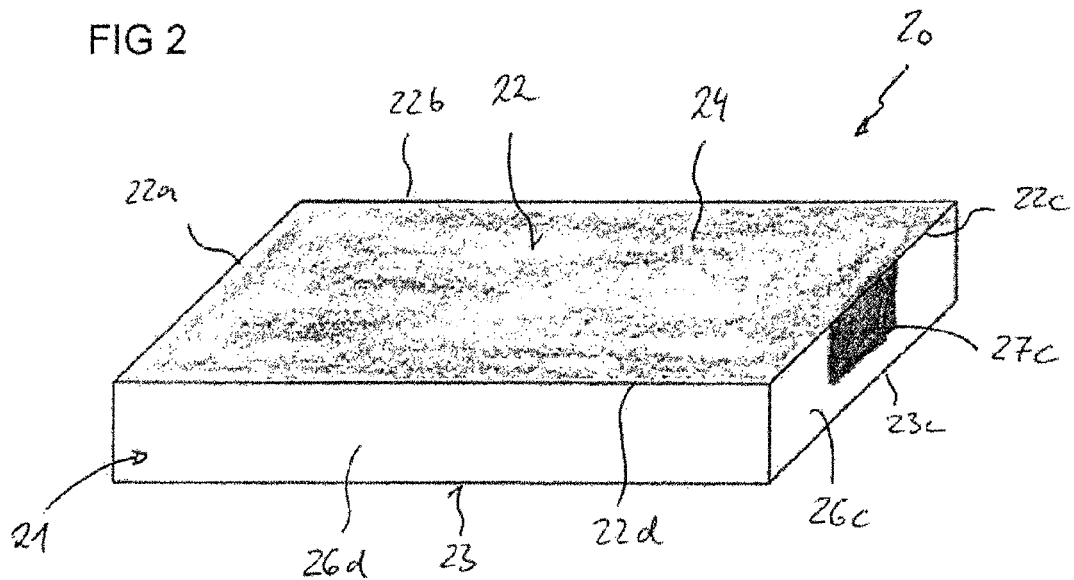
FIG. 2 shows a first exemplary embodiment of a sensor configured according to the invention for the actuator unit according to FIG. 1.

In FIG. 2 the electrode 24 extends over the entire surface of the end face 22. The result of this is that the electrode extends to the four side edges 22a, 22b, 22c, 22d the end face 22. A contacting segment 27c is disposed on the lateral surface 26c.

Figure 3:
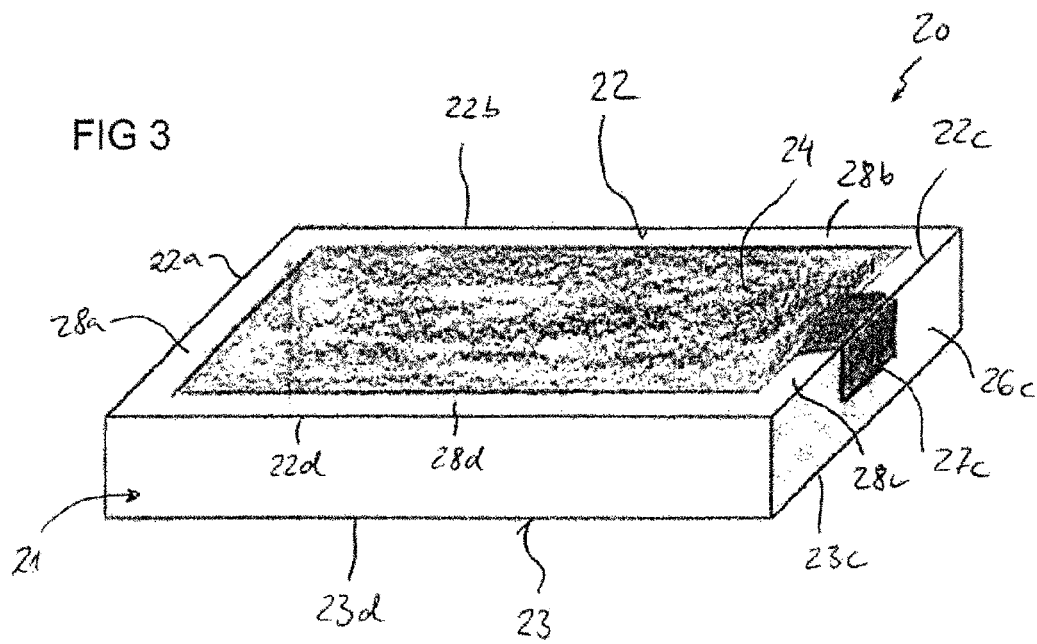
FIG. 3 shows a second exemplary embodiment of a sensor configured according to the invention for the actuator unit according to FIG. 1.

In FIG. 3 the electrode 24 is spaced apart from each of the side edges 22a, 22b, 22c, 22d by a spacing 28a, 28b, 28c, 28d. The contacting segment 27c is again disposed on the side edge 26c. The spacing enables the omission of further lateral insulation measures.

In FIG. 4 the electrode 24 is spaced apart only from the side edge 22a by a spacing 28a. Otherwise the electrode extends to the side edges 22b, 22c, 22d. The contacting segment 27c is again disposed on the side edge 26c. Similarly, the electrode 25 is spaced apart from the side edge 23c, wherein the contacting segment is disposed on the non-visible lateral surface 26a, i.e. opposite the contacting segment 27c. Said embodiment also enables the omission of otherwise usual insulation measures.

In FIG. 5 the electrode 24 is spaced apart from the side edges 22a and 22b by a spacing 28a, 28b. Otherwise the electrode extends to the side edges 22c, 22d. The contacting segment 27c is again disposed on the lateral surface 26c. In addition, a contacting segment 27d is provided on the lateral surface 26d. Similarly, the electrode 25 is spaced apart from the side edges 23c, 23d, wherein the contacting segments are disposed on the non-visible end faces 26a and 26b, i.e. opposite the contacting segments 27c, 27d. Said embodiment enables the omission of otherwise usual insulation measures and enables low-resistance contacting of the electrodes 24, 25.

In the exemplary embodiments described, the contacting segments and the associated electrode are produced in one step and form a unit. The represented contacting segment(s) only occupy, only by way of example, a part of the surface of the relevant side edge. For example, the contacting segment 27c could also extend to the side edge 23c of the end face 23. Likewise, the contacting segment 27c could also occupy a greater width. It could even extend over the entire lateral surface 26c. The same applies to the contacting segment 27d in FIG. 5 or all contacting segments provided on the sensor body 21.

By the direct application of the electrodes to the sensor body, the elasticity of the coupling region between the sensor and the component stack can be reduced or even almost completely eliminated. In particular, there is no loss of stiffness as a result of the conventionally used adhesive. The omission of adhesive has the further advantage that no contamination can occur as a result of solvent-adhesives.

The proposed embodiment enables the separate manufacture of the sensor and the piezoelectric actuator, which can be joined together at a later point in time.

The invention claimed is:

1. An actuator unit for an injection valve of an internal combustion engine of a vehicle, comprising:
   an electronic component in the form of a stack, with
      a plurality of inner stack electrode layers;
      a plurality of layers of material that react to the application of an electric field, wherein layers of material and the inner stack electrode layers are stacked alternately; and
      two outer stack electrodes, to which the inner stack electrode layers are each alternately electrically connected on at least one peripheral side of the component;
   a piezoelectric sensor comprising a sensor body and two outer sensor electrodes disposed on opposite end faces of the sensor body,
   wherein one of the two outer sensor electrodes of the piezoelectric sensor is coupled to the component through an insulation layer in a force-fit manner in the stroke direction of the component, and the piezoelectric sensor detects a force generated and applied to the one of the two outer sensor electrodes by movement of the component during operation of the component, the force applied to the one of the two outer sensor electrodes being detected as a voltage or charge between the two outer sensor electrodes,
   wherein the two outer sensor electrodes are comprised of electrically conductive material deposited directly onto at least one of the end faces of the sensor body.

2. The actuator unit as claimed in claim 1, in which a respective end face of the sensor body is bounded by side edges, wherein the electrode disposed on the respective end face is spaced apart from at least one of the associated side edges by a spacing.

3. The actuator unit as claimed in claim 1, in which the electrodes are produced by plasma deposition or sputtering or vapor deposition.

4. The actuator unit as claimed in claim 1, in which the sensor is connected to the component in a force-fit manner by an insulation layer.

5. The actuator unit as claimed in claim 1, in which at least one contacting segment of a respective electrode is disposed on at least one lateral surface of the sensor body, wherein the at least one contacting segment and the associated electrode are produced over a side edge in one step.

6. The actuator unit as claimed in claim 5, in which at least on a side edge opposite the contacting segment the spacing is provided between the electrode and said side edge.

7. The actuator unit as claimed in claim 1, in which the sensor body is a monolithic plate made of a piezo ceramic.

8. The actuator unit as claimed in claim 7, in which the piezo ceramic of the sensor is made of a different material from the layers of material of the component.

9. The actuator unit as claimed in claim 1, in which the electrodes have a layer thickness of less than 20 µm.

10. The actuator unit as claimed in claim 2, in which the electrodes have a layer thickness of less than 10 µm.

11. The actuator unit as claimed in claim 9, in which a respective end face of the sensor body is bounded by side edges, wherein the electrode disposed on the respective end face is spaced apart from at least one of the associated side edges by a spacing.

* * * * *